United States Patent Office 2,867,656
Patented Jan. 6, 1959

2,867,656

PREPARATION OF DIALKOXY ALKYL DERIVATIVES OF DIMERS OF CONJUGATED OLEFINS

Robert E. Robinson and John F. Nobis, Cincinnati, Ohio, assignors to National Distillers and Chemical Corporation, New York, N. Y., a corporation of Virginia No Drawing. Application March 27, 1956
Serial No. 574,089

8 Claims. (Cl. 260—533)

The present invention relates to a method for preparation of certain valuable isomeric mixtures of dialkoxy alkyl derivatives of dimers of conjugated diolefins and more particularly, to preparation therefrom of valuable products, such as by oxidation to dibasic aliphatic carboxylic acids in which the carboxyl groups are separated by not less than four methylene or substituted methylene groups, and by hydrolytic cleavage to glycols. Still more particularly, the invention relates to a process for preparation from butadiene of certain mixtures of sebacic acid, 2-ethylsuberic acid and 2, 5-diethyladipic acid.

It has recently been found that an aliphatic conjugated diolefin can be treated with an alkali metal such as sodium or potassium in finely dispersed form, preferably in the presence of a small amount of a polycyclic hydrocarbon compound and/or a solid attrition agent, in a selected ether medium at a relatively low temperature (preferably below about 0° C.) to produce in selective manner a mixture comprising dialkali metal derivatives of the dimerized diolefins. The resulting dialkali metal derivatives can then be carbonated, such as by use of Dry Ice, preferably at a temperature below about 0° C. to produce the corresponding metal salts of dicarboxylic acids in high yields and selectivities, said metal salts containing 2 more carbon atoms per molecule than the organometallic compound subjected to carbonation. For example, in the case of initial reaction between sodium and butadiene, the organometallic compounds comprise disodium derivatives of isomeric octadienes. Studies of the saturated diacids that are obtained after the mixture of dialkali metal derivatives of the dimerized diolefin is carbonated, followed by hydrogenation and acidification, show that mixtures of isomeric dicarboxylic acids are obtained. Thus, following hydrogenation and acidification of the product obtained by carbonation of a mixture of disodiooctadienes prepared as aforesaid, the product mixture yields sebacic acid, its isomers 2-ethylsuberic acid and 2,5-diethyladipic acid, and small amounts of other materials including monobasic carboxylic acids. In the use of other diolefins such as isoprene, dimethyl butadiene, pentadienes, and the like, for the initial reaction with the finely dispersed alkali metal, the mixture of final products will vary accordingly and are composed predominantly of $C_{12}$ and $C_{14}$ dibasic acids.

For carrying out the process aforedescribed for preparation of the dialkali metal derivatives of the conjugated diolefin dimers, suitable examples of the alkali metal that may be used include sodium and potassium with sodium being preferred as it provides for excellent selectivity and yields of desired dimerized products and is cheaper and more readily available. Use of chemically pure sodium is not essential, however, as mixtures containing a substantial amount of sodium are useful as are alloys of sodium and potassium, of sodium and calcium, and of sodium and lithium.

The diolefins which are useful for this improved process include aliphatic conjugated diolefins such as, for example, butadiene, isoprene, dimethyl butadiene, the pentadienes, as the methyl-1,3- pentadienes, and the like. In general, however, it is desirable to use the aliphatic conjugated diolefins having from 4 to 8 inclusive, carbon atoms.

The reaction medium found most suitable for carrying out the dimerization reaction consists essentially of an ether and only certain types of ethers are effective. The ether can be any aliphatic mono ether having a methyl group, in which the ratio of the number of oxygen atoms to the number of carbon atoms is not less than 1 : 4. Examples include dimethyl ether, methyl ethyl ether, methyl-n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, methyl butyl, ethyl butyl, dibutyl, and butyl lauryl ethylene glycol ethers, trimethylene glycol dimethyl ether, glycerol trimethyl ether, glycerol dimethyl ethyl ether, and diethylene glycol methyl ethyl ether, glycol formal, methyl glycerol formal, and the like. The simple methyl monoethers, as dimethyl ether, and the polyethers of ethylene glycols, as ethylene glycol dimethyl ether are preferred. Hydrocarbon solvents such as isooctane, kerosenes, toluene, and benzene cannot be used exclusively as reaction media since they adversely affect the dimerization reaction and give little or no yield of dimer products.

The ethers should not contain any groups such as hydroxyl, carboxyl and the like which are distinctly reactive towards sodium. Although the ether may react in some reversible manner, it must not be subject to cleavage to give irreversible reaction products during the dimerization process. Such cleavage action destroys the ether and introduces into the reacting system metallic alkoxides which, in turn, tend to induce rubber-forming reactions with the diolefin rather than the desired dimerization reaction.

Although the reaction medium should consist essentially of the specified ethers, other inert media can be employed in limited amounts. In general, these inert media will be introduced with the alkali metal dispersion as the liquid in which the alkali metal is suspended. They have the principal effect of diluting the ethers. As the effective concentration of the active ether is decreased by the increased addition of inerts, a minimum concentration of ether is reached below which the promoting effect is not evident. The exact minimum concentration depends upon the particular reactants and ether being used as well as the reaction conditions, such as temperature, reactant concentration, and the like, employed. In any event, the concentration of ether in the reaction mixture should at all times be maintained at a sufficient level to have a substantial promoting effect upon the dimerization reaction. In general, it is good practice to use a reaction medium having at least 50 wt. percent of active ether. Although the amount may be varied considerably, from 100 to 2000 cc. of the ether per mol of diolefin undergoing reaction has been found satisfactory.

In preparation of the alkali metal dispersion, it is desirable to employ at least one or more dispersing agents capable of promoting rapid and complete breakdown of the gross sodium particles. Choice of these dispersing aids is important, although a number of different selected materials can be used. In one system copper oleate is used for maximum rapid particle breakdown, and dimer acid for maximum dispersion stability. Aluminum stearate, as well as other selected metallic soaps have also been found to function quite satisfactorily. For optimum flow characteristics of the initial dispersion, other materials can also be used either alone or in combinations. Dispersing aids which are also useful include oleic acid, aluminum octanoate, calcium stearate, aluminum laurate, lead naphthenate, zinc stearate and other metallic soaps as well as lecithin, polymers, rubbers, etc.

In practice of such a process, the reaction temperature is preferably held below 0° C., and, more preferably, between —20° C. to —50° C., as generally speaking, all ethers begin to yield cleavage products at temperatures of about 0° C. and above with the result that sufficient alkoxides are formed to yield high polymeric acids rather than the desired low molecular weight dimers. However, and depending on the particular reaction medium employed, the reaction may be carried out at somewhat higher temperatures, with or without use of pressure, such as up to about 25° C., but use of the higher temperatures is generally not preferred as the yield of desired products tends to decrease as the temperature is increased over about 0° C.

In further illustration and in a preferred type of operation for the aforesaid process, the diolefin (e. g., butadiene) and finely dispersed alkali metal (e. g., sodium) are reacted in an attrition type apparatus such as a ball mill with a selected solid attrition agent, e. g., solid sodium chloride, sodium sulfate, flint pebbles and others. Dimetallo dimers of the diolefins (e. g., disodiooctadienes) thus formed are then carbonated to the sodium salts of the corresponding acids (e. g., the disodium salts of unsaturated $C_{10}$ aliphatic dibasic acids). Organic solvents are then removed and the solids are converted to an aqueous solution which is preferably filtered prior to hydrogenation to convert the sodium salts of the unsaturated acids to the salts of the corresponding saturated acids. Preferably, the hydrogenation operation to saturate the salts carried out by catalytic hydrogenation. The resulting aqueous reaction mixture contains, in addition to the dialkali metal salts of the linear $C_{10}$ saturated acid (e. g., sebacic), substantial amounts of its isomers in the form of dialkali metal salts. Upon acidification, such a mixture of the salts of the isomeric diacids yields the corresponding free acids in substantially quantitative amounts.

In the preparation of aliphatic diacids by the aforesaid method, wherein the dimetallo dimers of the diolefin are carbonated to produce the corresponding salts of unsaturated aliphatic acids having two more carbon atoms per molecule than the dimerized diolefin, and which unsaturated salts are then subjected to treatment including acidification and hydrogenation, the product mixtures contain the linear dicarboxylic acid in rather well defined proportional amounts relative to the branched isomers. Specifically illustrated by use of butadiene as the diolefin in a process as is aforedescribed, the product mixture of dicarboxylic acids obtained when the disodiooctadiene mixture is carbonated, generally comprises sebacic acid, 2-ethylsuberic acid and 2,5-diethyladipic acid in the ratio of about three parts of sebacic acid to five parts of 2-ethylsuberic acid to one part of 2,5-diethyladipic acid, i. e., a ratio of about one part of sebacic acid to two parts of its branched isomers.

For certain purposes it is desirable to obtain from the mixture of disodio derivatives of the diolefin dimer prepared by the aforesaid process, a substantially larger proportional amount of the branch chain isomer products. For example, it is desired in some instances, such as for preparation of diacids useful for esterification to products of modified plasticizing properties, to obtain from a mixture of disodiooctadienes prepared as aforedescribed, a relatively larger amount of branch chain $C_{10}$ aliphatic diacids in proportion to the linear isomer (sebacic acid) than is ultimately obtained from the process wherein the disodiooctadienes are carbonated, such as by contacting the disodiooctadiene mixture with an excess of Dry Ice.

It is the primary object of this invention to provide a process for treatment of dialkali metal dimers of diolefins, prepared by a process as aforedescribed, whereby to produce a mixture of dialkoxy derivatives of such dimers in which mixture there is present a substantially larger proportional amount of branch chain dimer derivatives than is obtained when the mixture of dialkali metal dimers of the diolefins are subjected to carbonation to form the corresponding dialkali metal salts of diacids having two more carbon atoms per molecule than the diolefin dimers. Another object is to provide a process for preparation of such a mixture of isomeric dialkoxy alkyl derivatives of the defined dimers and the preparation therefrom of isomeric mixtures of aliphatic dicarboxylic acids in which the proportional amount of branched chain isomers is greater than is obtained when the mixture of dialkali metal dimers, prepared as aforedescribed, are carbonated rather than being converted to dialkoxy derivatives as embodied herein.

In accordance with this invention, a mixture of dimetallo dimers, prepared by reacting a conjugated diolefin with an alkali metal as aforedescribed, is subjected to reaction with a suitable halo aliphatic ether, such as an alpha halo aliphatic ether, under conditions to convert the dimetallo dimers to dialkoxy alkyl derivatives of the diolefin dimers, the formation of the dialkoxy derivatives being effected by formation of the corresponding alkali metal halide and the coupling of residual organic radicals. The resulting mixture of the dialkoxy derivatives of the unsaturated dimers can then be subjected to treatment depending on the derivatives desired therefrom. Thus they may be subjected to hydrogenation to produce the corresponding saturated dialkoxy products, and oxidation of the resulting saturated dialkoxy derivatives to the corresponding acids. For preparation of other described material, such as glycols, the dialkoxy unsaturated derivatives may be hydrogenated and subjected to hydrolytic cleavage. As is described more fully hereinafter, and as is illustrated by use of a mixture of disodiooctadienes prepared by the described reaction between butadiene and finely dispersed sodium, the isomer distribution of the mixture of the dialkoxy derivatives of the dimers of the conjugated diolefin is illustrated by the preparation therefrom of a mixture comprising sebacic acid, 2-ethylsuberic acid and 2,5-diethyladipic acid in the relative proportion of 1:2:1 whereas the product acid mixture obtained by treatment of the disodiooctadiene mixture by carbonation comprises such acids in a ratio of about 3:5:1.

In practice of this invention, the mixture of the dialkali metal derivatives of the dimerized diolefin prepared as aforedescribed is subjected to treatment with an aliphatic halo ether under conditions to convert the mixture of the dialkali metal dimerized diolefins to a mixture of dialkoxy alkyl derivatives of the dimerized diolefin. The reaction is carried out by adding the ether to the isomeric mixture of the dialkali metal dimers of the conjugated diolefin while maintaining the mixture undergoing reaction at a temperature below the decomposition temperature of the dialkali metal dimers mixture, as for example, by maintaining the temperature at below about 25° C., and preferably 0° C., and below. The ether reactant may be used in an amount stoichiometrically equivalent to that required to react with the organo-alkali metal compounds to form the desired alkoxy derivative but, if desired, an excess of the halo ether may be used. For such usage, ethers such as chloro methyl ether, chloro ethyl ether, α-chloro propyl methyl ether, α-chloro ethyl propyl ether, chloro methyl vinyl ether, and others may be employed. In the preparation of the corresponding saturated alkoxy derivatives by hydrogenation, the saturation is effected preferably in catalytic manner with use of any of a variety of suitable hydrogenation catalysts under conventional hydrogenation conditions, as for example, by use of catalysts, including palladium, platinum, nickel, cobalt, and the like. Suitable reaction conditions include use of pressure from about 50 to about 5000 p. s. i.

For preparation of diacids from the alkoxy derivatives, the resulting mixture thereof is subjected to oxidation. For such a purpose, the oxidation may be carried out with a relatively strong oxidizing agent, an example of which is concentrated nitric acid, in the presence of appropriate inorganic catalysts such as vanadates (e. g. ammonium metavanadates), arsenates, etc.

In order to further describe the invention, the following embodiment is set forth but it should be understood that such an embodiment is employed for purposes of illustration and not limitation.

An attrition reactor was charged with 1200 grams of flint pebbles and 150 grams of dry sodium chloride. The vessel was cooled to −50° C. under a nitrogen purge and charged with 800 grams of dimethyl ether. 88.3 grams (1.92 gram atoms) of a 50% sodium dispersion in isooctane (containing 0.5% dimerized linoleic acid) and 3.0 grams of p-terphenyl were then added to the reactor. Technical grade 1,3-butadiene (104 grams, 1.9 mols) was then passed into the reactor at a constant rate of 1.9 grams per minute at −25° C. At the completion of the butadiene addition, the reactor contents were milled an additional ¼ hr. and then treated with 201 grams (2.5 mols) of chloromethyl ether over a 1½ hrs. period while maintaining a temperature of −40° C. Following completion of the chloromethyl ether addition, attrition was continued for 2 hrs. and the mixture was then treated with 250 mls. of methanol at −60° C. The mixture was allowed to stand overnight so as to insure complete evaporation of the dimethyl ether, then filtered whereby there was obtained a precipitate consisting of polymeric material which was discarded. The filtrate was extracted with hexane and the hexane solution was hydrogenated over 5% palladium on carbon at 50 p. s. i. and room temperature. The material was then stripped of solvent and distilled under reduced pressure whereby there was produced 129 grams (67% yield) of mixed dimethoxy decanes, B. P. 65–110° C., at 0.3 mm. pressure.

The isomer distribution in the mixture of dimethoxy decanes was determined by subjecting the mixture to a careful rectification in a vacuum jacketed column under reduced pressure and the following materials were isolated: 1,10-dimethoxydecane, B. P. 165° C./50 mm., $n_D^{25}$ 1.4267, 2-ethyl-1,8-dimethoxyoctane, B. P. 154° C./50 mm., $n_D^{25}$ 1.4280, and 2,5-diethyl-1,6-dimethoxyhexane, B. P. 141–5° C./50 mm., $n_D^{25}$ 1.4277. The individual dimethoxydecanes were identified by their infrared absorption spectra, their oxidative cleavage to the corresponding dibasic acids, and their hydrolytic cleavage to the corresponding glycols, i. e., 2-ethyloctanediol, 2,5-diethylhexanediol, and decanediol. The aforesaid isomeric ethers were obtained respectively, in the ratio of 1:2:1. For identification of the individual dimethoxydecanes by products formed by oxidative and hydrolytic cleavage, the following procedures were employed, illustrated by their use for oxidative and hydrolytic cleavage of 1,10-dimethoxydecane:

Oxidative cleavage

Over a six hour period, 3.0 g. of the 1,10-dimethoxydecane was added to a stirred suspension of 0.2 g. of ammonium metavanadate in 40 ml. of concentrated nitric acid at 40–45° C. After an additional stirring period of one-half hour, the resulting mixture was poured onto crushed ice. When the ice had melted, the mixture was filtered to yield 2.0 grams (66%) of sebacic acid, M. P. 129–133° C. No melting point depression was obtained upon admixture of that product with sebacic acid.

Hydrolytic cleavage

A small round bottomed flask was fitted with stirrer and reflux condenser. It was charged with 2.0 grams of 1,10-dimethoxydecane and 25 ml. of concentrated hydriodic acid. After being heated under reflux with stirring for 3 hours, the mixture was treated with 13 grams of solid NaOH, and heated under reflux for four hours. The resulting hot suspension was poured into water and neutralized with HCl whereupon a gummy semi-solid precipitate separated out and was collected on a filter. Recrystallization from methanol yielded 1,10-decanediol, M. P. 69–71° C.

Whereas the aforesaid procedure for treatment of the mixture of disodiooctadienes resulted in a product mixture of $C_{10}$ saturated aliphatic diacids in which the linear isomer was present in an amount of one part to three parts of branch chain isomers, treatment of the mixture of disodiooctadienes by carbonation with an excess of Dry Ice, followed by hydrogenation of the carbonated product with 5% of nickel hydrogenation catalyst, and acidification (HCl) of the resulting saturated salts of saturated dicarboxylic acids produced a mixture of corresponding acids in which the linear isomer was present in a ratio of about 1 part of linear isomer to about 2 parts of the branch chain isomers.

Also embodied herein as new compositions are alkoxy alkyl derivatives of dimerized conjugated diolefins, and mixtures thereof, such as are obtained in the process embodied herein by treatment of the dialkali metal derivatives of dimers of conjugated diolefins with a halo ether as aforedefined. Specifically, such compositions comprise the individual compounds which are precursors (before hydrogenation) of 1,10-dimethoxydecane, 1,8-dimethoxy-2-ethyloctane and 1,6-dimethoxy-2,5-diethylhexane, as well as mixtures of such unsaturated precursors and, more specifically, such mixtures in which, respectively, such precursors are present in a weight ratio of 1:2:1. Generally, however, embodied herein are new compositions of matter comprising an isomeric mixture of dialkoxy alkyl derivatives of dimers of conjugated diolefins obtained by subjecting, to the aforedescribed reaction with a suitable halo ether, an isomeric mixture of dialkali metal derivatives of dimers of a conjugated diolefin prepared by the aforedescribed method. Thus, in generic aspect, the compositions embodied herein are mixtures of isomeric unsaturated aliphatic ethers of the following formula

in which R is an aliphatic group, as, for example, containing one to eight carbon atoms, and $R^2$ is an unsaturated aliphatic group that contains two unsaturated carbon to carbon groups, and contains a dimer of a diolefin, said mixture being further characterized in that the major proportion thereof is composed of such ethers in which the dimer component of $R^2$ is branched chain and, more specifically, in which the ether in which $R^2$ is straight chain composes about one part of the straight chain ether to three parts of such ethers in which $R^2$ contains a branched chain in the dimer component thereof. Thus, in a mixture of unsaturated ethers prepared as aforedescribed by reaction of the disodiooctadienes with chloromethyl ether, the mixture comprises the following materials

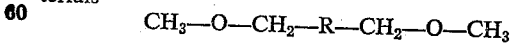

in which R is a dimer of butadiene, said mixture being further characterized in that the major amount thereof is composed of such ethers in which R is branched chain and, more specifically, a mixture which contains the defined ethers in a ratio of one part of ethers in which R is straight chain to three parts of such ethers in which R is branched chain.

The alkoxy unsaturated products thus prepared are suitable for use in preparation of plasticizers, by epoxidation of unsaturated groups, for vinyl resins, for cross-linking with maleic anhydride in preparation of alkyds of improved flexibility characteristics in protective-coatings, for preparation of hydrochlorinated derivatives (halogenated saturated alkoxy ethers) useful as plasticizers, and flameproofing agents, and for preparation of valuable derivatives such as glycols, diacids, and the like, as aforedescribed.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for preparation of isomeric mixtures of dialiphatic ether derivatives of aliphatic dimers of a conjugated diolefin which comprises subjecting a conjugated diolefin to reaction with a finely dispersed alkali metal in an ether reaction medium, said ether being a member from the group consisting of aliphatic monoethers having a methyl group in which the ratio of the number of oxygen atoms to the number of carbon atoms is not less than 1:4 and aliphatic polyethers including polyethers corresponding to those in which all of the hydroxyl hydrogen atoms of a polyhydric alcohol are replaced by alkyl groups, to produce an isomeric mixture of dialkali metal derivatives of dimers of said conjugated diolefins, said isomeric mixture being comprised predominantly of branched chain dimers of said diolefin, and subjecting said mixture to reaction with a chloro aliphatic ether of relatively low molecular weight to convert said mixture of alkali metal derivatives to a mixture of dialkoxy alkyl derivatives of dimers of said conjugated diolefin, said mixture of dialkoxy alkyl derivatives being comprised predominantly of such derivatives in which the diolefin dimer portion is branched chain.

2. A process, as defined in claim 1, wherein the mixture of dialkoxy alkyl derivatives of the dimers of said conjugated diolefin contains a larger proportional amount of branched chain isomers relative to straight chain isomers than is present when the mixture of dialkali metal dimers are carbonated.

3. A process, as defined in claim 1, wherein the alkali metal is sodium and the conjugated diolefin is butadiene.

4. A process as defined in claim 3, wherein the isomeric mixture of disodiooctadienes that is produced by reaction of the butadiene with sodium is subjected to reaction with an alpha chloro aliphatic ether at a temperature below about 25° C. to convert said isomeric mixture to an isomeric mixture of dialkoxy alkyl derivatives of dimers of butadiene and which mixture of isomeric dialkoxy derivatives is composed predominantly of such derivatives in which the butadiene dimer portion is a branch chain dimer.

5. A process, as defined in claim 4, wherein the chloro ether is chloromethylether.

6. A process, as defined in claim 4, wherein the isomeric mixture of dialkoxy derivatives of dimers of butadiene is hydrogenated to convert the dialkoxy derivatives to the corresponding saturated dialkoxy derivatives and the resulting saturated derivatives are oxidized to a dibasic mixture comprising sebacic acid, 2-ethylsuberic acid and 2,5-diethyladipic acid, said dibasic mixture being further characterized by being composed predominantly of the branch chain acids 2-ethylsuberic and 2,5-diethyladipic.

7. A process, as defined in claim 6, wherein the dibasic acid mixture comprises sebacic acid, 2-ethylsuberic acid and 2,5-diethyladipic acid in a ratio of about 1:2:1 respectively.

8. A process, as defined in claim 6, wherein the oxidation to the dibasic acid mixture is carried out with nitric acid.

References Cited in the file of this patent

UNITED STATES PATENTS

| | | |
|---|---|---|
| 2,352,461 | Walker | June 27, 1944 |
| 2,658,922 | Urban | Nov. 10, 1953 |

FOREIGN PATENTS

| | | |
|---|---|---|
| 1,093,096 | France | Nov. 17, 1954 |

OTHER REFERENCES

Whitmore: Organic Chemistry, 2nd ed., 1951, pp. 556, 611.

Royals: Advanced Organic Chemistry, 1954, p. 117.